United States Patent [19]
Nanis et al.

[11] Patent Number: 4,748,014
[45] Date of Patent: * May 31, 1988

[54] PROCESS AND APPARATUS FOR OBTAINING SILICON FROM FLUOSILICIC ACID

[75] Inventors: Leonard Nanis, Palo Alto; Angel Sanjurjo, San Jose, both of Calif.

[73] Assignee: SRI International, Menlo Park, Calif.

[*] Notice: The portion of the term of this patent subsequent to Apr. 10, 2001 has been disclaimed.

[21] Appl. No.: 802,634

[22] Filed: Nov. 26, 1985

Related U.S. Application Data

[62] Division of Ser. No. 453,337, Dec. 27, 1982, Pat. No. 4,584,181.

[51] Int. Cl.$^4$ .............................................. C01B 33/02
[52] U.S. Cl. ..................................... 423/350; 423/342; 423/490
[58] Field of Search ................ 423/350, 341, 342, 490

[56] References Cited

U.S. PATENT DOCUMENTS

| | | | |
|---|---|---|---|
| 4,233,338 | 11/1980 | Ricard et al. | 437/233 |
| 4,388,286 | 6/1983 | Kapur et al. | 423/348 |
| 4,442,082 | 4/1984 | Sanjurjo | 423/350 |
| 4,446,120 | 5/1984 | Schmidt et al. | 423/350 |
| 4,529,576 | 6/1985 | Sancier | 423/349 |
| 4,563,976 | 1/1986 | Foell et al. | 118/401 |
| 4,563,979 | 1/1986 | Falckenberg et al. | 118/694 |

*Primary Examiner*—John Doll
*Assistant Examiner*—Lori S. Freeman

[57] ABSTRACT

Process for producing low cost, high purity solar grade Si wherein a reduction reaction, preferably the reduction of SiF$_4$, by an alkali metal (Na preferred) is carried out inside a reaction chamber. The chamber wall and bottom surfaces are configured so as to facilitate the continuous separation of the products of reaction (Si and NaF) and removal of the molten salt by discharging the salt through one or more ports at the bottom of the reaction chamber. Such process is especially useful where it is desirable to discharge the reaction salt products from the reactor and retain silicon within the chamber for later removal.

3 Claims, 3 Drawing Sheets

FIG_1

FIG_2

FIG_3

PROCESS AND APPARATUS FOR OBTAINING SILICON FROM FLUOSILICIC ACID

ORIGIN OF INVENTION

The United States Government has rights in this invention pursuant to JPL/DOE Contract No. 954471-NAS 7-100 awarded by the U.S. Department of Energy. This invention together with the inventions described in the above related applications evolved (in-part) from research efforts aimed at preparing low cost, high purity silicon for solar cells. The results of that research are contained in the following reports prepared for JPL/DOE:

Quarterly Progress Report No. 1, "Novel Duplex Vapor-Electrochemical Method for Silicon Solar Cell", by: V. J. Kapur and L. Nanis, August 1976;

Quarterly Progress Report No. 2 and 3, "Novel Duplex Vapor-Electrochemical Method for Silicon Solar Cell", by: V. J. Kapur and L. Nanis, March 1976;

Quarterly Progress Report No. 4, "Novel Duplex Vapor-Electrochemical Method for Silicon Solar Cell", by: V. J. Kapur L. Nanis, and A. Sanjurjo, January 1977;

Quarterly Progress Report No. 5, "Novel Duplex Vapor-Electrochemical Method for Silicon Solar Cell", by: V. J. Kapur, L. Nanis, and A. Sanjurjo, February 1977;

Quarterly Progress Report No. 6, "Novel Duplex Vapor-Electrochemical Method for Silicon Solar Cell", by: V. J. Kapur, L. Nanis, and A. Sanjurjo, March 1977;

Quarterly Progress Report No. 7, "Novel Duplex Vapor-Electrochemical Method for Silicon Solar Cell", by: V. J. Kapur, L. Nanis, and A. Sanjurjo, April 1977;

Quarterly Progress Report No. 8, "Novel Duplex Vapor-Electrochemical Method for Silicon Solar Cell", by: V. J. Kapur, L. Nanis, and A. Sanjurjo, February 1978;

Quarterly Progress Report No. 9, "Novel Duplex Vapor-Electrochemical Method for Silicon Solar Cell", by: V. J. Kapur, L. Nanis, A. Sanjurjo, and R. Bartlett, April 1978;

Quarterly Progress Report No. 10, "Novel Duplex Vapor-Electrochemical Method for Silicon Solar Cell", by: V. J. Kapur, L. Nanis, K. M. Sancier, and A. Sanjurjo, July 1978;

Quarterly Progress Report No. 11, "Novel Duplex Vapor-Electrochemical Method for Silicon Solar Cell", by: V. Kapur, K. M. Sancier, A. Sanjurjo, S. Leach, S. Westphal, R. Bartlett, and L. Nanis, October 1978;

Quarterly Progress Report No. 12, "Novel Duplex Vapor-Electrochemical Method for Silicon Solar Cell", by: L. Nanis, A. Sanjurjo, and S. Westphal, January 1979.

Quarterly Progress Report No. 13, "Novel Duplex Vapor-Electrochemical Method for Silicon Solar Cell", by: L. Nanis, A. Sanjurjo, K. Sancier, R. Bartlett, and S. Westphal, April 1979;

Quarterly Progress Report No. 14, "Novel Duplex Vapor-Electrochemical Method for Silicon Solar Cell", by: L. Nanis, A. Sanjurjo, and K. Sancier, July 1979;

Quarterly Progress Report No. 15, "Novel Duplex Vapor-Electrochemical Method for Silicon Solar Cell", by: L. Nanis, A. Sanjurjo, and K. Sancier, November 1979;

Draft Final Report, "Novel Duplex Vapor-Electrochemical Method for Silicon Solar Cell", by: L. Nanis, A. Sanjurjo, K. Sancier, and R. Bartlett, March 1980; and Final Report, "Novel Duplex Vapor-Electrochemical Method for Silicon Solar Cell", by: L. Nanis, A. Sanjurjo, K. Sancier, and R. Bartlett, March 1980.

The subject matter of the aforementioned reports are incorporated herein by reference.

REFERENCE TO RELATED APPLICATIONS

This is a divisional of co-pending application Ser. No. 453,337 filed on Dec. 27, 1982 now U.S. Pat. No. 4,584,181.

Other copending United States patent applications relating to the general subject matter of this invention, assigned to the same assignee and incorporated herein by reference are as follows:

Process and Apparatus for Obtaining Silicon from Fluosilicic Acid, Ser. No. 337,136 filed Jan. 5, 1982 by Angel Sanjurjo;

Process and Apparatus for Casting Multiple Silicon Wafer Articles, Ser. No. P-1559 (Ser. No. 453,718) filed even date herewith by Leonard Nanis;

Process and Apparatus for Obtaining Silicon from Fluosilicic Acid, Ser. No. P-1563 (Ser. No. 453,457) filed even data herewith by Kenneth M. Sancier is now U.S. Pat. No. 4,529,676 (patented July 16, 1986);

Process and Apparatus for Obtaining Silicon from Fluosilicic Acid, Ser. No. P-1564 (Ser. No. 453,596) filed even date herewith by Kenneth M. Sancier;

Process and Apparatus for Obtaining Silicon from Fluosilicic Acid, Ser. No. P-1572 (Ser. No. 453,337) filed even date herewith by Leonard Nanis and Angel Sanjurjo is now U.S. Pat. No. 4,584,181 (patented Apr. 22, 1986); and Process and Apparatus for Obtaining Silicon from Fluosilicic Acid, Ser. No. P-1577 (Ser. No. 453,456) filed even data herewith by Angel Sanjurjo, now U.S. Pat. No. 4,442,082 having an issue date of Apr. 10, 1984.

BACKGROUND OF THE INVENTION

Field of Invention

Silicon is, at present, the most important material in modern semiconductor technology and is finding increased use in solar cells for the photovoltaic generation of electricity. In view of the importance of the solar cell application, the stringent requirements for purity and low cost and further in view of the orientation of the work done, the process and apparatus is described primarily in the content of production of silicon for solar cell use. However, it is to be understood that both the process and apparatus used are generally useful in the production of silicon for whatever end use, as well as other transition metals such as Ti, Zr, Hf, V, Nb and Ta.

A major deterrent to the development of practical solar photovoltaic systems is the cost of high purity silicon. With todays technology, approximately twenty percent of the total cost of a silicon solar cell is ascribed to the silicon material alone. That is, the cost of the silicon material produced by the conventional hydrogen reduction of chlorosilanes constitutes at least twenty percent of the cost of producing the cell. It is estimated that the cost of the silicon must be reduced by almost an order of magnitude before silicon solar photovoltaic panels will prove to be economically feasible as a power source. The fact that the chlorosilane processes require multiple separations, are so energy intensive and require such large capital investments indicate that cost of the silicon can not be reduced sufficiently to make silicon solar cells economically feasible without a major process change. As a consequence, an approach to the production of solar grade silicon which is less complex, less energy intensive and which requires less capital equipment would be desirable.

Technical Field of the Invention

It has been found that silicon of more than sufficient purity to meet the solar cell applications can be produced within the economic requirements from the metallic reduction of silicon fluoride. Preferably, the silicon fluoride is prepared from an aqueous solution of fluosilicic acid, a low cost waste by-product of the phosphate fertilizer industry by treatment with a metal fluoride which precipitates the corresponding fluosilicate. This salt is filtered, washed, dried and thermally decomposed to produce the corresponding silicon tetrafluoride and metal fluoride which can be recycled to the precipitation step. The silicon tetrafluoride is then reduced by a suitable reducing metal and the products of reactions are treated to extract the silicon. Each of the steps is described in detail using sodium as typical reducing agent, and sodium fluoride as typical precipitating fluoride but the concept applies as well to other reducing metals and metal fluorides that can reduce silicon fluoride and form fluosilicates.

The process in one form is described in detail in an article entitled Silicon by Sodium Reduction of Silicon Tetrafluoride authored by A. Sanjurjo, L. Nanis, K. Sancier, R. Bartlett and V. J. Kapur in the Journal of the Electrochemical Society Vol. 128, No. 1, January 1981 and the subject matter of that article is specifically incorporated herein by reference.

Background

There are available systems for the production of silicon utilizing some of the reactions of the present system. For example, Joseph Eringer in U.S. Pat. No. 2,172,969 describes a process wherein sodium silicofluoride is mixed with sodium in powder form and placed in a crucible which is heated and in the upper part of which two pieces of copper wire gauze are placed parallel to each other. The space between the pieces of gauze, which can also be heated, is filled with copper wool. When the crucible has been filled and closed, it is heated to about 500° C. At this temperature, reaction takes place and silicon and sodium fluoride are formed whereby the silicon which is mechanically expelled by the sudden increase in pressure is collected in chambers or towers connected to the furnace.

The equation of the reaction is as follows:

or this can be expressed:

After the reaction product has been cooled at least to 200° C. it is finely divided and is treated with water or heat treated with dilute 1:1 sulfuric acid. Hydrogen fluoride gas is liberated (which latter can then be made into hydrofluoric acid or a metallic fluoride) metallic sulphates are produced and the silicon separates out on the surface in amorphous form as shining metallic froth.

The reaction expressed in equation form is:

After the silicon has been separated from the metallic sulphate solution, it is again washed and is dried at 80° C. The silicon obtained in this way is in the form of an impalpable redish or grey-brown powder which discolors strongly and which, even if the raw products were impure, contains a minimum of 96-97% silicon. The yield amounts to about 87% of the theoretically possible yield.

Robert Aries reports in U.S. Pat. No. 3,041,145 that attempts made to reduce silicon halides by the use of sodium vapor have not led to a commercially successful process. He gives as an example the process discussed in the Eringer patent, supra, and points out 96%-97% purity is entirely outside the range of purity required for silicon to be used for photocells, semiconductor rectifiers, diodes, and various types of electronic equipment. As has already been discussed, the conventional hydrogen reduction of chlorosilanes especially with the electro-thermal deposition techniques used, is too energy intensive to be economical.

Aries ascribes the purity problem to impurities in the sodium used in the reduction reaction and teaches that further elaborate and expensive purification of the purest available commercial grade sodium is required to produce silicon of solar or semiconductor grade. More recently, V. J. Kapur in U.S. Pat. No. 4,298,587 also supports the view that such purification is required. In fact, this patent teaches that both the sodium and the silicon tetrafluoride must be purified using an energy intensive technique comparable to the electro-thermal deposition systems of the chlorosilane reduction processes.

It has been determined that silicon of the desired grade is obtained without the elaborate purification of commercial grade sodium or silicon tetrafluoride obtained from the fluosilicic acid (from the reaction shown above) provided the reduction reaction is carried out in such a way that it goes to completion, the proper environment is maintained during the reduction reaction and the product is properly isolated from contaminating atmosphere and container walls until the reaction is complete and solid silicon which is below reaction temperature is formed and separated. In copending patent application entitled Process and Apparatus for Obtaining Silicon from Fluosilicic Acid, Ser. No. 337,136 filed Jan. 5, 1982 by Angel Sanjurjo and assigned to the present assignee, the isolation from the container is carried out using a powdered substance so that the reaction product does not adhere and can be removed by a simple dumping process. The system is successful but generally is not needed in connection with the melt separation of the present process.

The present invention is directed to the part of the process which deals with the manner of carrying out the separation of the products of reaction (Si and NaF) produced by the reaction between SiF$_4$ and an alkaline earth metal (eg. Na). In carrying out the reaction, finely divided reactants are jetted into the reaction chamber. Both U.S. Pat. No. 4,188,368 to Wolf et al and U.S. Pat. No. 4,102,765 to Fey et al deal with reactions where Si is produced using finely divided injected feed stocks. Keeton U.S. Pat. No. 4,169,129 discloses an apparatus and process for pulse feeding a fine spray of liquid Na into a Si production reactor. Bagley U.S. Pat. No.

2,995,440 and Baker U.S. Pat. No. 3,069,255 disclose procedures for introducing molten Na into a reaction vessel with chlorides of titanium, while Hill U.S. Pat. No. 2,890,953 discloses a procedure for adding atomized liquid Na in a reactor (also with chlorides of titanium). Maurer (U.S. Pat. No. 2,941,867) separately charges a reducing metal reactant and a halide of a high melting metallic element from group II, III, IV, V and VI of the periodic table both in the fluid state into an externally cooled reaction zone.

In order to appreciate the problem of carrying out the reaction, consider (as noted above) that when liquid Na at 150° C. contacts $SiF_4$, a rapid exothermic reaction takes place. The Na burns in the $SiF_4$ atmosphere to produce Si and NaF. Since Na melts at 98° C., in principle, liquid Na at temperatures below 140° C. can safely be drop-fed into a reactor kept under a constant $SiF_4$ pressure. The reaction takes place at the bottom of the reactor which is kept at temperatures above 200° C. Experimentally, it is observed that due to the heat generated by the reaction, the Na injection nozzle overheats and the reaction takes place at the nozzle causing a build up of reaction products which plug the nozzle, and thus, the Na feeding system.

Further, the reaction products produced by the systems disclosed in the patents are in a form that is difficult to separate. In view of the stringent purity requirements for solar grade silicon, separation techniques that tend to introduce impurities are distinctly disadvantageous.

The present invention is specifically concerned with melt separation of the reaction products produced by reaction of Na and $SiF_4$. The reaction is performed in a reaction chamber configured in such a manner that the reaction products (Si and NaF) are easily separated by melt separation and the NaF continuously removed.

SUMMARY AND OBJECTS OF INVENTION

In carrying out the present invention sodium fluosilicate $Na_2SiF_6$ is precipitated from fluosilicic acid followed by thermal decomposition of the fluosilicate to silicon tetrafluoride $SiF_4$. The $SiF_4$ is then reduced by an alkali metal, preferably Na, to obtain silicon which is separated from the mix, preferably by melt separation. The reduction reaction is carried out by jetting finely divided reactants into a reaction chamber at a rate and temperature which causes the reaction to take place far enough away from the injection or entry region so that there is no plugging at the entry area and thus, the reactants are freely introduced. The reaction is carried out inside a reaction chamber configured in such a manner that the resulting reaction products (Si and NaF) which are formed within the reaction chamber can be separated directly and the NaF continuously removed as a molten liquid by passage through one or more drainage channels (of suitable cross section) running downward along the lower peripheral reactor chamber side wall and along the reactor chamber bottom passing through one or more drainage ports for discharging NaF.

The invention has for its principal object the provision of a process for obtaining silicon of sufficient purity to produce solar photovoltaic cells inexpensively enough to make their use practical.

A further object of this invention is to provide a process by means of which silicon can be obtained which is substantially free of impurities starting with relatively inexpensive and impure fluosilicic acid.

A still further object of this invention is to provide a process for producing Si wherein $SiF_4$ and a reductant, preferably Na, are introduced into a reactor in finely divided form and at a rate and temperature that causes the reduction to take place at a location removed from the entry area so that the reaction products do not prevent introduction of either of the reactants into the reactor.

Another object of the invention is to provide a process for producing solar grade Si by reaction of $SiF_4$ and a reductant in such a manner that Si is separated from the reaction products continuously and directly.

Yet another object of the invention is to provide a reactor vessel for separating Si from the molten reaction products of a Si producing reaction.

Still a further object of the invention is to provide process and apparatus for continuously separating Si in molten form from the molten reaction products.

Another object of the invention is to provide process and apparatus for continuously separating Si in molten form from the molten reaction salt products by gravitationally discharging the molten salt products.

A further object of the invention is to provide process and apparatus for continuously separating Si in solid form from the molten reaction salt products by gravitationally discharging the molten salt products.

The novel features which are believed to be characteristic of the invention are set forth with particularity in the appended claims. The invention itself, however, both as its organization and method of operation, together with further objects and advantages thereof may best be understood by reference to the following description taken in connection with the accompanying drawings.

DESCRIPTION OF PREFERRED EMBODIMENTS

Figures 1, 2:
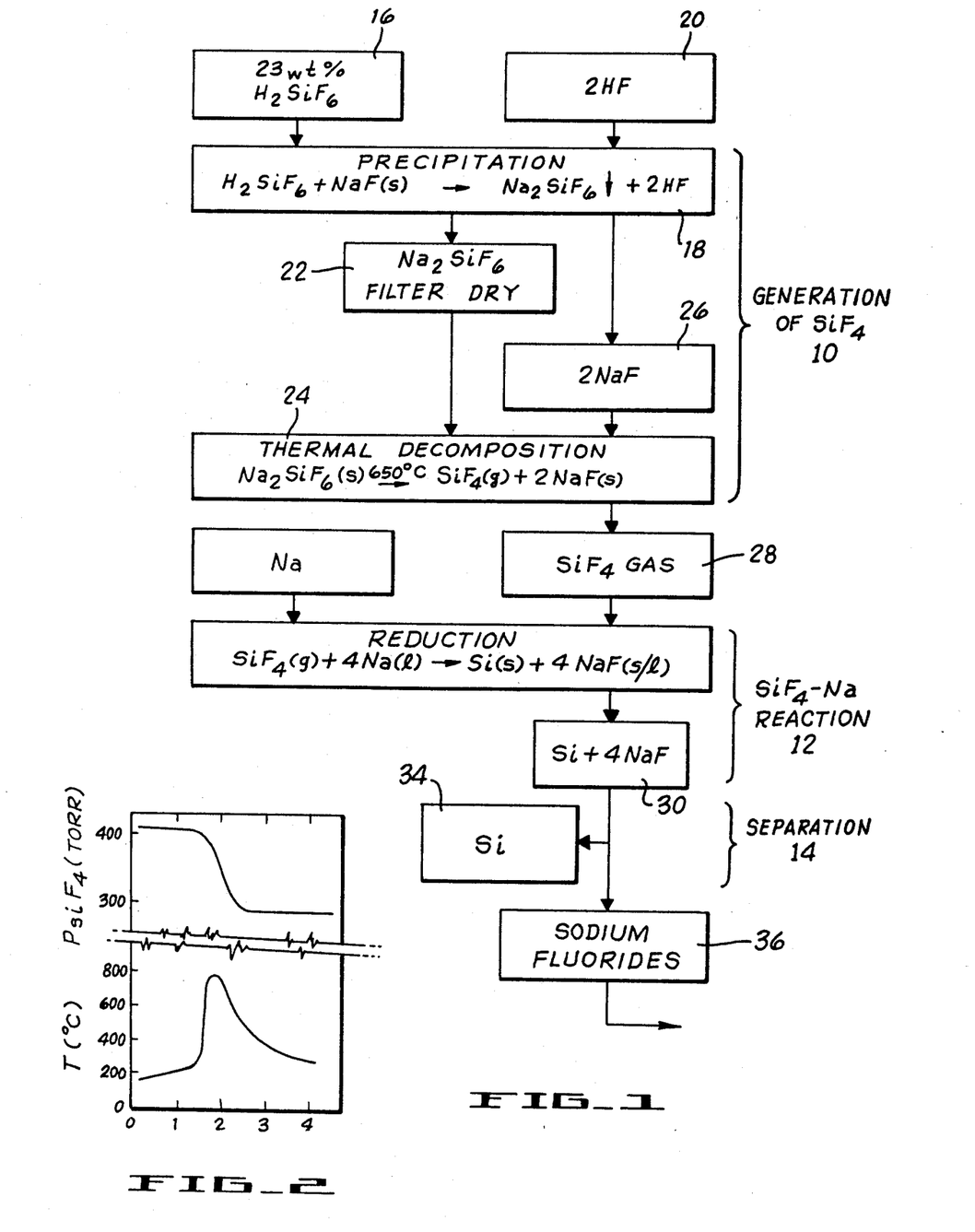
FIG. 1 is a flow diagram illustrating a preferred embodiment of the process for producing high purity silicon by the melt process.
FIG. 2 is a graph illustrating the time, temperature and pressure characteristics of the silicon fluoride and sodium reaction showing time in minutes plotted along the axis of abscissae and temperature in degrees C. and pressure (torr) plotted along the axis of ordinates.

A preferred embodiment of the process for production of pure silicon starting with inexpensive commercial grade fluosilicic acid is illustrated in the flow diagram of FIG. 1. The overall process consists of three major operations which encompass a series of steps. The first major operation (shown in brackets 10 in the drawing) includes the step of precipitation of sodium fluosilicate from fluosilicic acid followed by generation of silicon tetrafluoride gas. The second major operation (brackets 12 on the drawing) comprises the reduction of silicon tetrafluoride to silicon (30), preferably by sodium, and the third operation (brackets 14) involves the separation of silicon from the mixture of silicon and sodium fluoride.

Consider first the steps for generation of silicon tetrafluoride (operation 10). The preferred starting source of silicon is an aqueous solution of fluosilicic acid ($H_2SiF_6$), a waste product of the phosphate fertilizer industry, that is inexpensive and available in large quantities. Fluosilicic acid of commercial grade [23 weight percent (w%)] has also been used directly as received without purification or special treatment and is shown as the silicon source 16 in FIG. 1. As another alternative, fluosilicic acid is obtained by treating silica, or silicates (natural or artificially made) with hydrogen fluoride. The $SiF_6^{-2}$ is then precipitated in sodium fluosilicate $Na_2SiF_6$, by adding a sodium salt to the solution (step 18). Other salts such as NaF, NaOH, NaCl, or similar salts of the elements in groups IA and IIA of the periodic table are all candidates. The major selection criteria are, low solubility of the corresponding fluosilicate, high solubility of impurities in the supernatant solution, high solubility of the precipitating fluoride salt, and nonhygroscopic character of the fluosilicate.

Based on these criteria, the preferred fluosilicates in order of preference are $Na_2SiF_6$, $K_2SiF_6$ and $BaSiF_6$. Using the preferred NaF as the precipitating salt, the hydrogen of the fluosilicic acid is displaced by the sodium to form sodium fluosilicate, a highly stable, nonhygroscopic, white powder, and sodium fluoride which is recycled. In equation form the reaction is As an example, sodium fluosilicate was precipitated by adding solid sodium fluoride directly to the as received commercial grade fluosilicic acid 18. The yield was a supernatant liquid containing mostly HF and some NaF and $H_2SiF_6$ along with the sodium fluosilicate. HF is also given off 20). The supernatant fluid was removed and the sodium fluosilicate washed with cold distilled water to remove any remaining HF and $H_2SiF_6$. After filtering and drying in an oven at 200 degrees C., a minimum yield of 92% of pure sodium fluosilicate 22 (determined by x-ray diffraction) was obtained. The product sodium fluosilicate is a nonhygroscopic white powder that is very stable at room temperature and thus provides an excellent means for storing the silicon source before it is decomposed to silicon tetrafluoride.

Precipitation under the just described conditions acts as a purification step, with most impurities in the original fluosilicic acid staying in solution. This effect is increased by adding suitable complexing agents to the fluosilicic acid solution previous to the precipitation. Both inorganic complexing agents such as ammonia and organic agents such as EDTA (ethylenediaminetetraacetic acid) help to keep transition metal ions in solution during precipitation of the fluosilicate.

The fluosilicate is thermally decomposed 24. thus, to give the solid sodium fluoride, which is recycled 26, and to generate the $SiF_4$ gas 28. The decomposition does not take place appreciably at temperatures below 400° C. Therefore, impurities which are volatile at this temperature can easily be removed by a vacuum treatment below this temperature. The decomposition of Na takes place at temperatures between about 500° and 700° C. Impurities left in the solid phase are typically transition metal fluorides such as Fe, Ni, Cu, etc., whose volatility at temperatures below 700° C. is very low and therefore do not contaminate the $SiF_4$ gas. The gas thus produced can be fed directly to the reduction reactor or it can be stored for future use.

In separate experiments, it was determined that $SiF_4$ gas at a pressure of 0.4 atm is in equilibrium at 650° C. with solid $Na_2SiF_6$ and NaF. Therefore, as $SiF_4$ is needed, the $Na_2SiF_6$ is thermally decomposed (FIG. 1) at 650° C. in a graphite-lined, gas-tight stainless steel retort. Gaseous $SiF_4$ evolved at 650° was condensed as a white solid in a storage cylinder (cooled by liquid nitrogen) attached to the retort. The $SiF_4$ gas was allowed to expand by warming of the storage cylinder to room temperature and was fed into the reactor as needed. $SiF_4$ gas prepared in this manner was determined by mass spectrometric analysis to be more pure than commercial grade $SiF_4$, as shown in Table I. Ions formed from the sample gas were identified from the observed mass numbers, isotopic distribution and threshold appearance potentials. The detection limit was better than 0.005%. Positively identified gaseous impurities are listed in Table I; no metallic impurities were detected. Peaks corresponding to B compounds, such as $BF_3$, were specially checked, but none were found.

TABLE I

| | Mass spectrometric analysis of $SiF_4$ | |
|---|---|---|
| Ion | $SiF_4$ prepared from $H_2SiF_6$ (%) | $SiF_4$ commercial (%) |
| $SiF_3^+$ | 96.9 | 93.6 |
| $Si_2OF_6^+$ | 3.04 | 4.24 |
| $SiOF_2^+$ | (—) | 1.79 |
| $CCl_3^+$ | (—) | 0.159 |
| $SiO_2F_2^+$ | 0.076 | 0.098 |
| $Si_2O_2F_4^+$ | (—) | 0.081 |
| $SO_2$ | (—) | 0.035 |

Although the $SiF_4$ produced from $H_2SiF_6$ has less impurity, the commercial grade $SiF_4$ was also used for experimental convenience. The possible presence of metallic impurities in commercial $SiF_4$ was determined by bubbling the gas through high purity water and treating the resulting slurry with an excess of HF to drive off Si as $SiF_4$. The final clear solution was then analyzed by plasma emission spectroscopy. (PES). The results are listed in Table II, together with PES analysis of the waste by product $H_2SiF_6$ and NaF used to precipitate $Na_2SiF_6$ (18 and 22 FIG. 1). Comparison of the first two columns of Table II with column three shows that the concentration of some elements, e.g., Li, C. V. Mn, Co, K, and Cu, were unchanged by precipitation of $Na_2SiF_6$ whereas the elements Mg, Ca, Al, P, As, and Mo were diminished by a factor of 5–10. Some elements were concentrated into the $Na_2SiF_6$, namely Cr, Fe, and Ni. The fourth column in Table II is representative of the impurity content to be found in $SiF_4$ gas prepared on a commercial scale. The low content of P is of special significance for both semiconductor and solar cell applications. Elements known to reduce solar cell efficiency (V, Cr, Fe, Mo) are uniformly low in commercial grade $SiF_4$. Only Mn, As, and Al are of comparable concentration in both $Na_2SiF_6$ and $SiF_4$ at the 1 parts per million (ppm) by weight or less level.

$SiF_4$/Na reaction, the central operation of the pure Si process, (FIG. 1) is the reduction of $SiF_4$ by Na according to the reaction $$SiF_4(g) + 4Na(l) = Si(s) + 4NaF(s)$$

The reaction is thermodynamically favored at room temperature, however, it has been found experimentally that Na has to be heated to about 150° C. before any appreciable reaction can be observed. Once the reaction has been initiated the released heat raises the temperature of the reactant (Na) which in turn increases the reaction rate. Under adiabatic conditions, a temperature of 2200 K. is predicted for the reaction with the stoichiometric quantities of $SiF_4$ and Na. In practical reactors, rapid consumption of gaseous $SiF_4$ produces a pressure decrease. The kinetic behavior of the Na—$SiF_4$ reaction is complex because of the interplay of several factors, e.g., pressure of $SiF_4$, vaporization of Na, local temperature, porosity of two solid products, and transport of $SiF_4$ and Na vapor through the product crust that forms on the liquid Na.

TABLE II

| Element | $H_2SiF_6$ | NaF | $Na_2SiF_6$ | $SiF_4$ |
|---|---|---|---|---|
| Li | 0.1 | (—) | 0.2 | 0.01 |
| Na | 460 | (—) | (—) | 1.8 |
| K | 9.0 | (—) | 8.0 | 0.3 |
| Mg | 55 | (—) | 6.4 | 2.3 |
| Ca | 110 | 10 | 18 | 1.6 |
| B | 1.0 | (—) | 0.8 | <0.01 |
| Al | 8.0 | <2.5 | 1.3 | 1.2 |
| P | 33 | (—) | 5 | 0.08 |
| As | 8.8 | (—) | 0.2 | 0.28 |
| V | 0.3 | <5 | 0.3 | <0.01 |
| Cr | 0.8 | <3.5 | 8.8 | <0.01 |
| Mn | 0.2 | <4 | 0.4 | 0.16 |
| Fe | 13 | <7 | 38 | 0.04 |
| Co | 0.54 | (—) | 0.7 | <0.01 |
| Ni | 1.17 | <8 | 4.2 | <0.01 |
| Cu | 0.12 | <4 | 0.6 | <0.01 |
| Zn | 1.4 | (—) | 1 | <0.01 |
| Pb | 14.5 | (—) | 5 | 0.03 |
| Mo | 11 | (—) | 1.0 | <0.01 |

Although only preliminary studies have been made of the kinetics, the general features of this reaction have been surveyed. In a series of experiments to estimate reaction temperature 5 grams of Na were loaded in a Ni crucible (3 cm ID, 4 cm high) and heated in $SiF_4$ initially at about 1 atm pressure. The Na surface tarnished at about 130° C., with the formation of a thin brown film. As the temperature increased, the color of the surface film gradually changed from light brown to brown and finally to almost black. The $SiF_4$/Na reaction became rapid at about 160° +/−10° C. and liberated a large amount of heat, as indicated by a sudden rise in reaction temperature. The pressure in the reactor typically decreased slightly until the temperature increased sharply, with an associated rapid decrease in $SiF_4$ pressure. The reaction lasts for several seconds only (until the Na is consumed). For $SiF_4$ pressures below 0.3 atm the reaction mass was observed to glow at a dull red heat. For higher pressure, a characteristic flame was observed. The shortest reaction time (20 sec) and the highest temperatures (about 1400° C.) were obtained when the initial pressure of $SiF_4$ was about 1 atm. In addition, complete consumption of Na was obtained for 1 atm $SiF_4$. When scale-up of this reaction was attempted by loading larger amounts of Na, it was found that as the depth of the Na pool increased, the amount of Na remaining unreacted also increased. The product formed a crust on top of the Na surface, building a diffusion barrier for the reactants. As the barrier thickness increased, the reaction slowed and eventually stopped.

For separation (operation 14 FIG. 1) of the silicon from the products of reduction, in the preferred melt separation process embodiment of this invention, the products are heated until a melt is formed and the NaF is drained off 36 leaving the Si 34. The melting and separation process is described in detail below in connection with the scaled up system. Leach separation is described in the copending Sanjurjo application previously referenced. In the leach process, the silicon and sodium are removed and combined with water and a selected acid. The resultant silicon and water soluble sodium fluoride are then separated.

Figure 3:
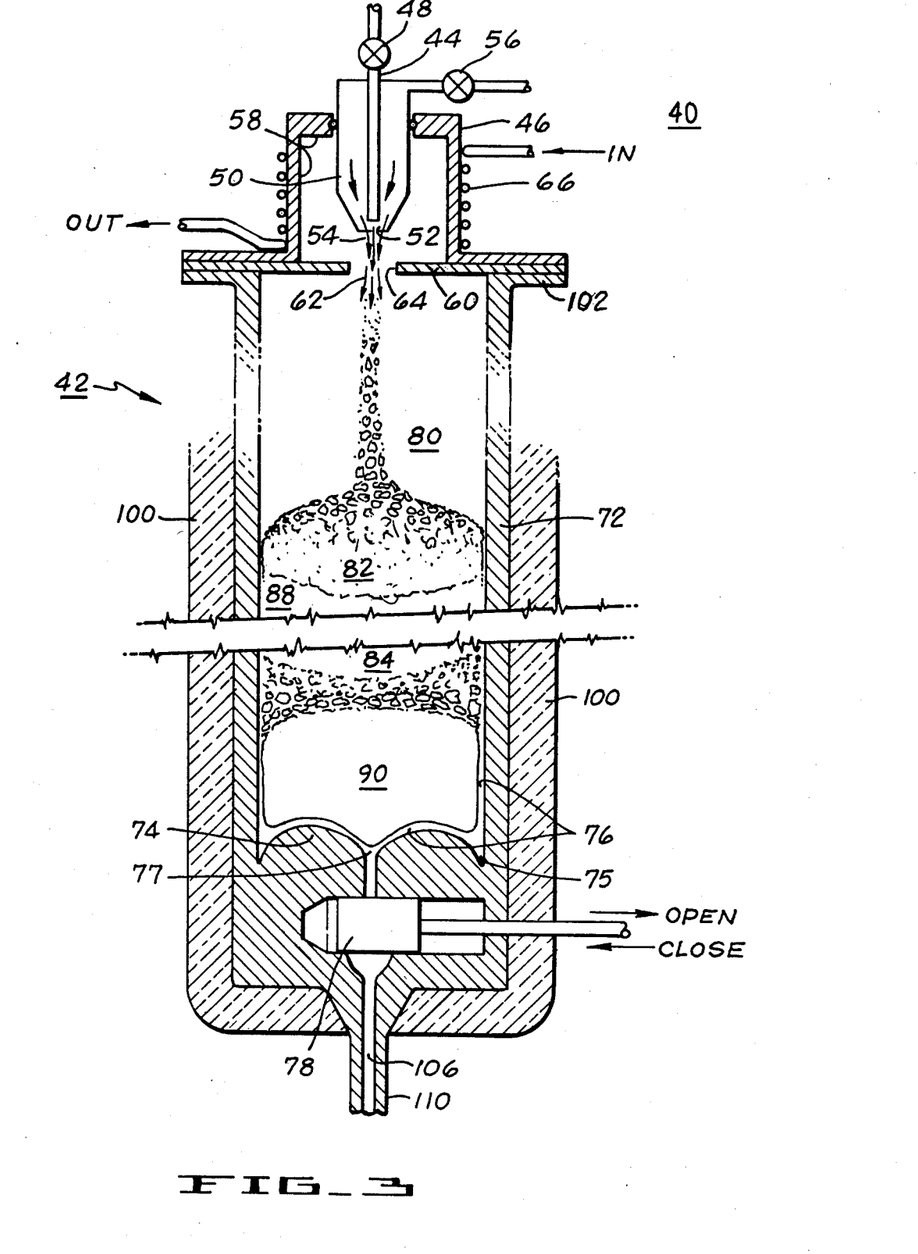
FIG. 3 is a somewhat diagrammatic central vertical section through a reactor unit showing details of one embodiment of the reaction product separation means and NaF removal means according to the present invention.

On the basis of studies of the parameters that affect the reaction, a system was designed that is shown in FIG. 3 which includes an reactant feed arrangement and a reaction product separation configuration in the central vertical section through the reactor. It is noted that the reactant feed arrangement is specifically designed to cause the reduction reaction to take place far enough away from the feed system (into the reactor) positively to prevent build up of reaction products at the entry and, thus, avoid any possibility of plugging of the entering reactants.

The upper section 40 of the reactor system, shown somewhat schematically in FIG. 3, constitutes a reactant (Na and $SiF_4$) dispenser and the lower section 42 is the reactor section where the reaction takes place. In this illustrated embodiment, the reactant dispenser section 40 includes a stainless steel liquid sodium injection tube 44 vertically and centrally located in the top flange 46 of the reactor. The Na injection tube 44 is provided with a conventional stainless steel bellows valve 48 for controlling Na flow into the reactor section 42. The inner diameter of the Na injection tube 44 is selected to provide the desired Na jetting action, assure an appropriate Na stream ejection velocity and Na stream size.

In order to bring the reactants together in the reaction zone and to provide some cooling of the entering liquid Na, a $SiF_4$ feed head 50 is positioned concentrically around the entry portion of the Na ejection tube 44 with its ejection aperture 52 positioned to feed $SiF_4$ into the reactor concentrically around the Na stream 54. The $SiF_4$ is fed into the reactor at room temperature and its entry is controlled by a constant pressure valve 56 in order to keep pressure constant in the reactor at from about 0.5 to about 5 atmospheres. That is, as $SiF_4$ is fed concentrically with the Na into the hot zone of the reactor, the $SiF_4$—Na reaction takes place depleting $SiF_4$. The depletion in turn activates the constant pressure valve 56, thus, feeding more $SiF_4$ into the reactor. The resultant gas flow keeps a relatively constant temperature at the injection region by its cooling action and by producing a jet that keeps hot particles of reaction products from reaching the nozzle end of Na feed tube 44. Keeping the reaction products away from the reactant entry area in this manner eliminates plugging of the injection apertures.

This mode of operation increases the rate of Si production. Using a Na nozzle exit aperture of 0.005 inch and jetting Na above its reacting temperature of 150° C., the reaction took place far enough away from the entry area to prevent plugging for injection temperatures up to about 50° C. No plugging occurs for reaction temperatures up to about 900° C. The reduction reaction (FIG. 1 operation 12) takes place in the lower reactor section 42 of the reactor system. As previously noted, the reduction reaction is highly exothermic and therefore, temperature control is desirable to help prevent reaction products from moving up near the reactant injection area. Such control prevents reactants from plugging the injection nozzle and preventing reactant injection. With temperature control in mind, the top reactant injection nozzle supporting flange 46 for the reactor 42 is cupped 58) or recessed (upwardly in the drawing) thermally to isolate the injection area from the hotter regions of the reactor 42. Further isolation from the hot reaction region is provided by inserting a disk like toroidal heat insulating baffle 60 between the reaction zone and the nozzle thus, effectively forming a semiisolated nozzle entry chamber 62. The centrally located aperture 64 in the baffle 60 is of a size to let reactants from the nozzle enter the reaction zone, prevent the injected products from spraying the outer reactor walls and minimize heat transmission between the reaction area in the reactor 42 and the nozzle entry chamber 62.

Additional temperature control is provided by oil cooled tubing 66 which extends around the cupped portion 58 of the nozzle supporting flange 46. In this connection, note again that it has been found experimentally that Na reacts with $SiF_4$ only above 150° C. Therefore, as long as the cooling coils 66 in cooperation with the reactant input temperatures, jet velocities and heat shielding baffle 60 maintain the reactant feed area below this temperature, premature reaction at the feed port and nozzle plugging is prevented. Further to the point of preventing premature reaction, the $SiF_4$ is preferably injected at a temperature of between about −86° and 120° C. and the liquid Na is jetted at a temperature of between about 98° and 130° C.

Figures 4, 5, 6:
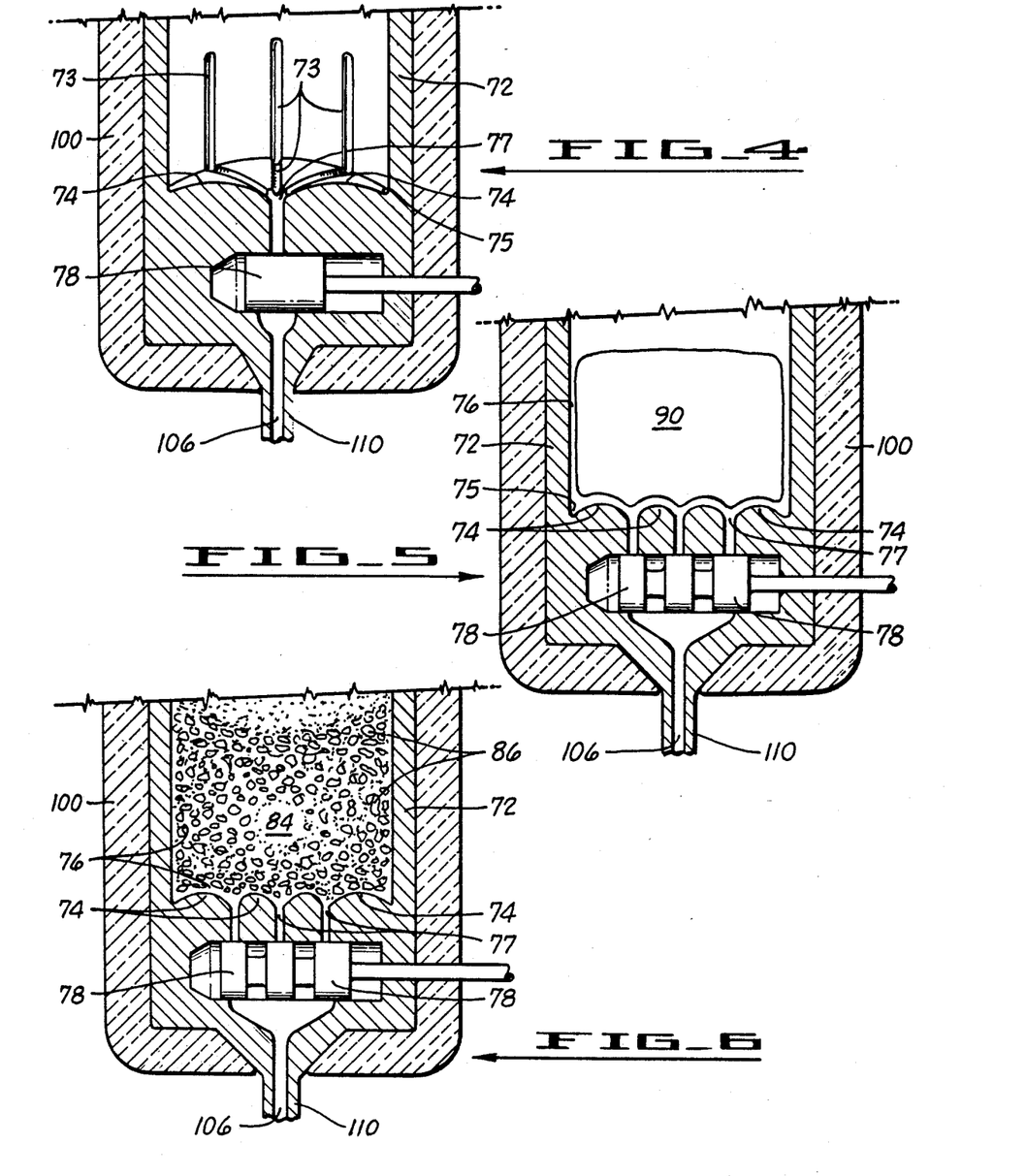
FIG. 4 is a diagrammatic central vertical section through the bottom portion of FIG. 3 showing details of the lower portion of the reaction chamber including a plurality of drainage channels running downward along the lower peripheral side wall and reactor chamber bottom into a central drainage port, and a circular shaped edge trough.
FIG. 5 is a diagrammatic vertical section through the bottom portion of a reactor unit similar to FIG. 3 showing details of another embodiment of the separation means according to the present invention.
FIG. 6 is an illustration of FIG. 5 showing separation of molten NaF in accordance with another aspect of the instant invention.

It is contemplated that the reaction products (NaF and Si) will be separated by a melt process at temperatures above the melting point of Si (1412° C.) and preferably in the range between about 1450° and 1500° C. It is also contemplated that the separation and removal of the salt products of reaction will take place on a continuous basis. The physical structure and configuration of the reactor portion 42 of the system is designed to produce such results. The same reactor designed for melt separation of the reaction products (i.e., Si 90 and NaF 76) above the melting point of Si may also be utilized to separate NaF 76 from Si 86 (as illustrated in FIG. 6) at temperatures between below about 1412° C. and above about the melting temperature of NaF (as illustrated in FIG. 6).

As illustrated, the reactor section 42 includes a generally cylindrical reaction product receiving and separating container 72. In order to withstand the high temperatures involved and to avoid contaminating the reaction products, the container 72 is composed of high purity graphite and in order to perform the separation of reaction products, the lower portion of the container 72 is generally designed to be enclosed by at least one bottom portion 74 (as illustrated in FIG. 4) which is preferably (semi) toroidal in shape with a solid non-porous cylindrical molten NaF removing drainage port 77 in the center and thus, having the appearance of a common funnel. The drainage port 77 is shown closed by a movable drain plug 78. Alternatively, the chamber bottom may be configured (as illustrated in FIG. 5) with a plurality of concentric (semi) toroidal shape rings 74 and a plurality of molten NaF removing drainage ports 77 closed by a movable multiple segmented drainage plug 78. The condition illustrated is for a normal run in process with reaction products built up and some melt separation products in place.

The Na and $SiF_4$ are jetted into the inner container 72 through the aperture 64 in the heat insulating baffle 60 and reaction starts to take place in the hot upper reaction zone 80. As the reaction proceeds, a pool 82 of reacted and partially reacted Na and $SiF_4$ form where the reaction goes to completion (pool described above). Immediately below the pool of reaction products 82, a hotter melt separation zone 84 is formed. The melt separation zone 84 is maintained at a much higher temperature (means of heating explained below) than the reaction products zone 82 above it and the reaction products effectively melt out. At these temperatures, ie temperatures above 1412 degrees C., the reaction products (Si and NaF) are liquids which are separable because the NaF will normally float on top of the Si. That is, the liquid Si, which is more dense than NaF, agglomerates and settles to the bottom of the reactor vessel 72. Liquid NaF, which melts at about 993° C., is immiscible with Si and usually wets graphite in the presence of liquid Si. The more or less spherical globules of Si dispersed in the NaF 88 and the large Si pool 90 at the bottom, as illustrated in FIG. 3, look much like those actually found in a sectioned graphite container after the reaction products, heated to the temperatures contemplated here, have been allowed to cool (solidify). It is apparent that, while molten, the NaF coats the Si, thus, providing a barrier which prevents the Si from reacting with the graphite and avoids any impurity transfer or migration through and from reactor walls.

Due to its relatively high surface tension (relative to NaF), Si remains in the container 72 while the low surface tension NaF flows out the port(s) 77 provided the port(s) are of the proper size for the temperatures of the reaction products. It has been determined experimentally that for the melt zone temperatures contemplated, port(s) 77 dimensions in the bottom of the inner reaction product receiving and separating container 72 of between about 2 and about 3.5 millimeters (mm), the NaF flows through while the molten Si 90 (in the case at which the temperature of the separation zone 84 is operated above about the melting point of silicon) or the solid Si 86 (in the case at which the temperature of the separation zone 84 is operated below about the melting point of silicon) remains in the container 72. If the port dimensions are appreciably smaller than about 2 mm, the NaF does not discharge well and for apertures appreciably greater than about 3.5 mm Si tends to enter and interfere with NaF discharge. The NaF is removed by extracting the movable closure plug 78 to allow the NaF to flow out of the reaction container drainage port(s) 77. The closure plug may be of different configuration depending on the configuration and number of drainage ports forming the bottom of the reaction chamber. The flow is adjusted so that the process is continuous. That is, the flow of NaF out the drainage port(s) 77 is adjusted so that the reduction reaction is continuously taking place in the reaction zone 80 and reaction products continuously settle through the reaction product zone 82 and into the melt separation zone 84 with NaF continuously flowing out the drainage port(s) while Si is retained at the bottom of the reaction chamber.

The generally cylindrical container 72 and induction heating elements (not shown) which heat container 72 is surrounded by a insulation layer 100 which minimizes radiation heat loss. The functions performed by the container 72 in large measure prescribe the characteristics of the material and its structure. For example, the fact that the container 72 collects and dispenses the NaF reaction product makes it desirable to make the the container of a material which will not slough off, react with the hot NaF, or in any way introduce contaminates which would prevent the NaF from being recycled without being purified.

It is also desirable that the container 72 at its lower portion be lined with suitable channels to facilitate NaF drainage. It is contemplated that the lower reactor chamber side wall and reactor chamber bottom be constructed to have a plurality of connected drainage channels 73 (of suitable cross section, preferably about 2 to about 3.5 millimeters in effectuve cross-section) running downward along the lower peripheral reaction chamber side wall and along the reactor chamber bottom into one or more drainage ports 77 for discharging reaction salt products (i.e., NaF). The (semi) toroidal shape bottom 74 and the inner cylindrical reactor side wall meet to form a circular shaped edge trough 75 which is contemplated to facilitate the passage of NaF along the bend connecting the side wall and bottom channels. Preferably, (for separation zone operation above about the melting point of Si) reactor chamber bottom is contemplated to have a surface of positive total curvature sufficient to displace the molten Si pool 90 bottom surface away from the (bend) edge trough 75 and further facilitate the passage of NaF along their channeled path(s) (77) for controlled release through the discharge channel (106) at the discharge port (110).

For heating efficiency and to reduce heat radiation from the reactor, the heating elements (not shown) are covered with a silica felt insulation 100 (1.3 cm thick). The top flange 46 of the reactor 42, the flange which supports the reactant injection nozzles (Na injection tube 44 and SiF$_4$ feed head 50), mates and is sealed to an outwardly extending lip or flange 102 around the top of the outer reaction chamber or vessel 102. Since the Si in container 72 is in the presence of NaF salt, the salt prevents (as explained above) formation of SiC.

The remaining NaF 76 (next to the Si 90 in the case at which the separation zone 84 is operated above about the melting point of silicon or next to the Si 86 (as illustrated in FIG. 6) in the case at which the separation zone 84 is operated below about the melting point of silicon) is easily removed by a conventional aqueous leaching process. For example, the salt coating 76 is readily removed in 1.0N acid solution. For a discussion of aqueous leaching of NaF, see copending Sanjurjo patent application Ser. No. 337,136 entitled Process and Apparatus for Obtaining Silicon from Fluosilicic Acid filed Jan. 5, 1982 and assigned to the assignee of the present invention.

The process sequence shown in FIG. 1 was selected because of the inherent simplicity of the steps and their independent and combined suitability for scale-up.

Some purification occurs during precipitation (operation 1, FIG. 1) for Mg, Ca, Al, P, and As due to the high solubility of their fluosilicates and fluosalts. Some concentration takes place for Cr, Fe, and Ni, and this effect may be due to coprecipitation of these elements as fluorides since their fluosilicates are very soluble. From Table II, it is clear that most of the purification is accomplished as a result of the thermal decomposition in step 24 (FIG. 1). Most transition metal fluorides are in very stable condensed phases at the decomposition temperature (650° C.) in step 24 (FIG. 1) and, therefore, will stay in the solid. In addition, volatile fluorides formed during the decomposition of fluosalts such as Na$_2$TiF$_6$ and Na$_2$ZrF$_6$ will condense upon cooling of the SiF$_4$ gas stream from step 24. The condensed material is then removed from the gas mainstream by in-line fume particle filtration. The presence of any metallic or dopant impurities was not detected using mass spectrometry (Table I) in either the gas produced in the above reaction or in the commercial SiF$_4$ gas. The analysis done on the SiF$_4$ by passing the gas through high purity water was based on the hypothesis that impurities should be hydrolyzed and/or trapped in the SiO$_2$ formed.

The results listed in Table II show that the level of metal impurities in the resulting SiO$_2$ is so low that, for practical purposes, the SiF$_4$ can be considered free of metallic impurities. The Na feed, reactor materials, and possible contamination of the product during handling remain as possible sources of impurities in the Si.

The impurities in Na can be divided roughly into three types according to their tendency to react with SiF$_4$, as classified by the free energy of reaction. The first type of impurity includes aluminum and elements from the groups IA, IIA and IIIB. The free energy of reaction of SiF$_4$ with these impurities ranges from about $-100$ to $-200$ kcal/mole SiF$_4$ at room temperature and from about $-50$ to $-100$ kcal/mole SiF$_4$ at about 1500 K. It is expected, therefore, that even when these impurities are present at the ppm level, they will react with the SiF$_4$ to form corresponding fluorides. Subsequently, the fluorides will be dissolved preferentially in the NaF phase.

The second type impurity includes transition metals such as Mo, W, Fe, Co, Ni, and Cu, and the elements P, As, and Sb. These elements exhibit positive free energies of reaction in excess of 100 kcal/mole SiF$_4$ and are not expected to react with SiF$_4$. However, it is an experimental fact that the silicon resulting from the SiF$_4$—Na reaction contains amounts of Fe, Ni, and Cr in proportion to the concentration of these elements in the Na feed. The mechanism by which these metals are transferred to the silicon has not yet been studied. In any case, the concentration of Fe, Cr, Ni, and also Ti can be decreased by a factor of about $10^4$ to $10^6$ for single-pass directional solidification or the Czochralski crystal-pulling procedures used presently for solar cell manufacture. At the resulting levels, these elements would not be detrimental to solar cell performance.

Boron represents a third type of impurity. The free energy of reaction of this element with SiF$_4$ is positive but small (5–20 kcal/mole SiF$_4$ for temperatures up to 1500 K); therefore, some partial reaction can be expected and B will be distributed between the NaF and Si phases. It is noted that the levels of the dopant elements B, P, and As in the reaction Si are the same as in the semiconductor grade silicon used as reference or control. Since it is convenient to have dopant levels as low as possible to permit flexibility in subsequent doping procedures for semiconductor and solar cell applications, the low B and P content of Si produced in this process is of advantage. It is noted that the purity of the silicon produced by the $SiF_4$—Na reaction is, at a minimum, nominally appropriate for solar cell manufacture.

From the foregoing discussion, it will be understood that the objects of the invention have been carried out in that high purity Si can be prepared using the inexpensive starting materials $H_2SiF_6$ and Na. Favorable thermodynamics of the reduction step, easily controlled kinetics, and abundant availability of inexpensive starting materials make this method attractive. Of special interest for semiconductor applications are the low concentrations of B and P impurities in the product Si. The Si produced by the $SiF_4$—Na reaction, particularly when purified further by directional solidification, should be a low cost material suitable for the manufacture of solar cells and other semiconductor products.

While particular embodiments of the invention have been shown, it will, of course be understood that the invention is not limited thereto since many modifications in both process and apparatus employed may be made. It is contemplated that the appended claims will cover any such modifications as fall within the true spirit and scope of the invention.

What is claimed:

1. A process for producing solar grade silicon by reaction of gaseous silicon tetrafluoride with sodium in substantially stoichiometric quantities to produce a reaction product from which silicon is recovered by melt separation and wherein said fluoride gas used in the reaction is obtained by thermal decomposition of sodium fluosilicate which is precipitated from aqueous fluosilicic acid generated from phosphate rock conversion to fertilizer, said process comprising: carrying out said reaction inside a graphite reaction chamber formed with at least one bottom drainage port therethrough, said port being of sufficient size so that essentially all reaction product other than silicon freely flow through and silicon is preferentially contained, said flow being due to the low surface tension of said other reaction products as compared to that of silicon.

2. A process according to claim 1, wherein said separation is conducted at a temperature above about the melting point of silicon.

3. A proces according to claim 1, wherein said separation is conducted at a temperature below about the melting point of silicon.

* * * * *